United States Patent [19]

Hayakawa

[11] Patent Number: 5,526,233
[45] Date of Patent: Jun. 11, 1996

[54] ADAPTER FOR INTEGRATED CIRCUIT DEVICE, AND DATA TRANSMISSION SYSTEM USING THE SAME

[75] Inventor: Tomihiro Hayakawa, Sayama, Japan

[73] Assignee: Casio Computer Co., Ltd., Tokyo, Japan

[21] Appl. No.: 992,864

[22] Filed: Dec. 17, 1992

[30] Foreign Application Priority Data

Dec. 19, 1991 [JP] Japan .................... 3-354912
Aug. 20, 1992 [JP] Japan .................... 4-245884

[51] Int. Cl.⁶ .................... H05K 1/14; G06K 19/04
[52] U.S. Cl. .................... 361/737; 235/488; 235/492; 361/728; 361/747
[58] Field of Search .................... 235/492, 495, 235/488; 429/96–100; 343/702, 705; 455/89; 361/684, 737, 728, 730, 731, 732, 747, 761, 807, 809, 825; 257/679, 678; 439/68, 928, 71, 72, 73; 174/52.4; 364/249.2

[56] References Cited

U.S. PATENT DOCUMENTS

| | | | |
|---|---|---|---|
| 3,372,310 | 3/1968 | Kantor | 235/492 |
| 4,463,971 | 8/1984 | Hoppe et al. | 235/488 |
| 4,511,796 | 4/1985 | Aigo | 235/492 |
| 4,661,653 | 4/1987 | Aigo | 174/52.4 |
| 4,707,594 | 11/1987 | Roth | 235/492 |
| 4,798,946 | 1/1989 | Fujii et al. | 235/492 |
| 4,842,966 | 6/1989 | Omori et al. | 429/96 |
| 4,862,249 | 8/1989 | Carlson | 257/679 |
| 4,923,404 | 5/1990 | Redmond et al. | 439/73 |
| 4,933,808 | 6/1990 | Horton et al. | 361/760 |
| 4,935,745 | 6/1990 | Mori et al. | 343/702 |
| 4,994,659 | 2/1991 | Yabe et al. | 235/492 |
| 5,016,086 | 5/1991 | Inoue et al. | 257/679 |
| 5,049,728 | 9/1991 | Rovin | 235/492 |
| 5,124,508 | 6/1992 | DuBrucq | 174/260 |
| 5,151,774 | 9/1992 | Mori et al. | 257/679 |
| 5,193,220 | 3/1993 | Ichinobe et al. | 455/89 |
| 5,350,945 | 9/1994 | Hayakawa | 257/679 |

FOREIGN PATENT DOCUMENTS

| | | | |
|---|---|---|---|
| 2057518 | 10/1993 | Canada | 361/737 |
| 0402182 | 12/1990 | European Pat. Off. | |
| 2538930 | 7/1984 | France | |
| 59-228743 | 12/1984 | Japan | 257/679 |
| 5-166953 | 7/1993 | Japan | 257/730 |
| 2082804A | 3/1982 | United Kingdom | |
| 2149980 | 6/1985 | United Kingdom | 439/71 |

*Primary Examiner*—Donald A. Sparks
*Attorney, Agent, or Firm*—Frishauf, Holtz, Goodman, Langer & Chick

[57] ABSTRACT

An IC memory device has input/output terminals, a holder for detachably housing the memory device, and an IC card-type adapter which is provided with connection terminals to be connected to the terminals of the memory device housed in the holder. The memory device is solely attached to or detached from a small electronic device such as a wrist watch and makes serial data transmission/reception therebetween. The memory device is set in the adapter and makes parallel data transmission/reception between it and an electronic device having connection terminals to the connectors of the adapter.

17 Claims, 7 Drawing Sheets

ADAPTER FOR INTEGRATED CIRCUIT DEVICE, AND DATA TRANSMISSION SYSTEM USING THE SAME

BACKGROUND OF THE INVENTION

1. Field of the Invention

The present invention relates to an integrated circuit device adapter which is provided with a small integrated circuit memory device having a plurality of data input/output terminals to be connected to a small electronic device, and is to be connected to a larger electronic device, and a data transfer system using the same.

2. Description of the Related Art

An IC card is used by sealing an LSI chip in a conventional card case, and a variety of methods are realized in accordance with usage. The IC card indicates the card which include any sort of integrated circuit in a broad sense, but it is specified for, in general, one including a microprocessor and a memory (as a memory, EEPROM which is electrically erasable and electrically writable, and EPROM is erasable by ultra violet rays and electrically writable), and being in conformity with ISO rule. In order to avoid confusion, a card which includes only a memory as an integrated circuit, is called as a memory card (specifically, RAM card, ROM card, ROM cartridge, etc.).

Memory cards are widely used in digital electronic devices such as calculators, word processors, pocket computers, electronic notebooks, etc. The memory cards used for these digital electronic devices is generally formed to have a size of 54 mm×85 mm. There is a memory card having a size one half of the above described one. However, the latter one is still too large to be applied to a wrist-type electronic device such as a wrist watch. If the wrist-type electronic device becomes to have functions such as a word processor, pocket computer, electronic notebook, it is extremely useful in terms of portability. If the memory card being mountable in such a wrist-type electronic device is formed to have a shape of a thin disk or coin in accordance with a shape of the electronic device, it is preferable to make the device compact.

However, if such a thin disk-type integrated circuit memory device is developed, this integrated circuit memory device cannot be applied to anything but the wrist-type electronic devices since the memory device is different in a size, shape, data transfer mode, etc. from the conventional ones. The wrist-type electronic device is small and portable, but the operability of the device is usually not high, and the number of functions thereof is limited. Consequently, the device cannot be mounted to a word processor, a pocket computer, or the like, or it cannot exchange data with such an electronic device.

SUMMARY OF THE INVENTION

The present invention has been proposed in consideration of the above problem, and its object is to provide an adapter for an integrated circuit device which can mount a small integrated circuit memory device applied in a small electronic device such as a wrist-type electronic device.

According to a first aspect of the invention, an adapter for a memory device comprises a case including a housing portion and a memory device holder; the housing portion having a space for detachably storing the memory device holder; the memory device holder having a thin disk-like space portion for detachably storing a memory device, and engaging means for engaging the memory device holder with the housing portion; the memory device having a thin disk-like shape and including a plurality of input/output terminals; and a circuit board housed in the housing portion. The circuit board comprises a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion; and connection leads, each connection lead connected to a corresponding one of the connection terminals. A connector is mounted on the housing portion and includes a plurality of input/output pins, each of the input/output pins having one end connected to a corresponding one of the connection leads of the circuit board, and another end exposed to the outside of the adapter so as to be connectable to an electronic device.

According to another aspect of the invention, a data transfer system comprises a memory device having an integrated circuit chip and a plurality of input/output terminals; and an adapter for electrically connecting the memory device to an electronic device; the adapter including a case which has a housing portion and a memory device holder. The housing portion has a space for detachably storing the memory device holder;

The memory device holder has a space portion for detachably storing the memory device, and engaging means for engaging the memory device holder with the housing portion. A circuit board is housed in the housing portion, the circuit board comprising a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion; and connection leads, each connection lead being connected to a corresponding one of the connection terminals. A connector is mounted in the housing portion and includes a plurality of input/output pins, each of the input/output pins having one end connected to a corresponding one of the connection leads of the circuit board, and another end exposed to the outside of the adapter so as to be connectable to the electronic device.

According to still another aspect of the invention, a data transfer system comprises a memory device in which an integrated circuit chip is housed, the memory device including a plurality of input/output terminals; a first electronic device having input/output elements which are connectable to the input/output terminals of the memory device; the memory device and the first electronic device transferring data therebetween in a serial fashion; an adapter for electrically connecting the memory device to a second electronic device; the adapter including a case which has a housing portion and a memory device holder; the housing portion having a space for detachably storing the memory device holder; the memory device holder having a space portion for detachably storing the memory device, and engaging means for engaging the memory device holder with the housing portion; and a circuit board housed in the housing portion. The circuit board comprises a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion; and connection leads, each connection lead being connected to a corresponding one of the connection terminals. A connector is mounted in the housing portion and includes a plurality of input/output pins having one end connected to a corresponding one of the connection leads of the circuit board and another end exposed to the outside of the adapter so as to be connectable to the second electronic device. The second electronic device has input/output elements which are connectable to the exposed another ends of the input/output pins of the connector.

According to still another aspect of the invention, a data transfer system comprises a memory device in which an integrated circuit chip is housed, the memory device including a plurality of input/output terminals; a first electronic device having input/output elements which are connectable to the input/output terminals of the memory device; an adapter for electrically connecting the memory device to a second electronic device; the adapter including a case which has a housing portion and a memory device holder; the housing portion having a space for detachably storing the memory device holder; the memory device holder having a space portion for detachably storing the memory device, and engaging means for engaging the memory device holder with the housing portion; and a circuit board housed in the housing portion. The circuit board comprised a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion; and connection leads, each connection lead being connected to a corresponding one of the connection terminals. A connector is mounted in the housing portion and includes a plurality of input/output pins, each of the input/output pins having one end connected to a corresponding one of the connection leads of the circuit board, and another end exposed to the outside of the adapter so as to be connectable to the second electronic device; and the second electronic device has input/output elements which are connectable to the exposed another ends of the input/output pins of the connector. The adapter and the second electronic device transfer data therebetween in a parallel fashion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Various embodiments of the present invention will now be described with reference to accompanying drawings.

Figure 1:
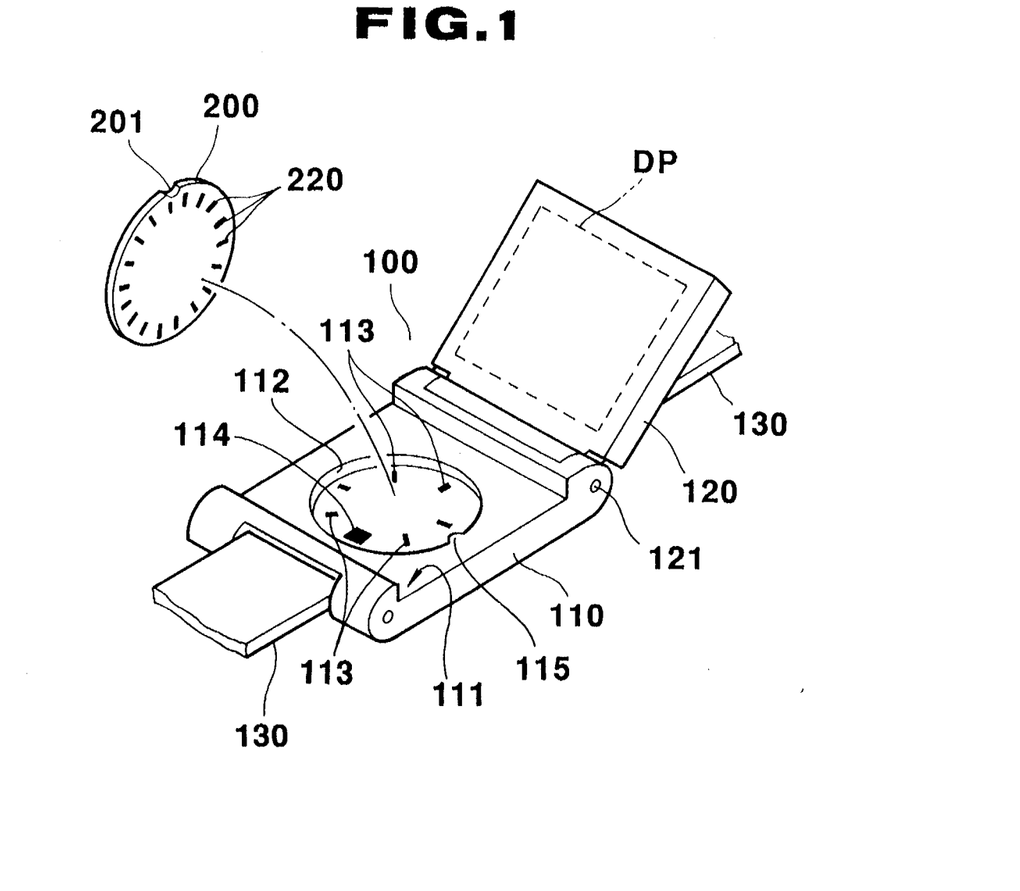
FIG. 1 is a perspective view showing an integrated circuit memory device and a small electronic device for mounting the integrated circuit memory device, both of the devices being according to an embodiment of the invention.
Figure 2:
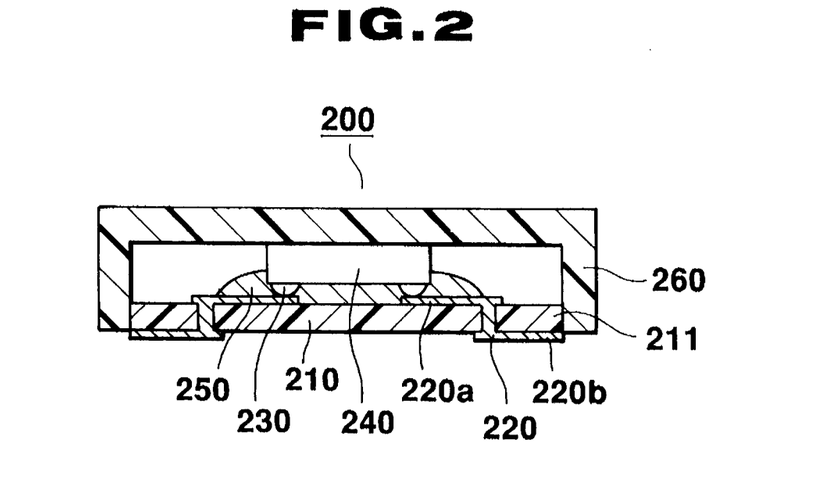
FIG. 2 is a longitudinal sectional view of the integrated circuit memory device shown in FIG. 1.

FIG. 1 is a perspective view of a small electronic device according to an embodiment of the invention in its open state, and FIG. 2 is a longitudinal sectional view of an integrated circuit memory device.

This small electronic device 100 comprises an integrated circuit memory device 200 to be housed in a main body case 110, and is constructed as a wrist watch. The data memorized in the integrated circuit memory device 200 is supplied into the small electronic device 100 in a serial transfer, and is displayed on a display portion (described later) of the small electronic device 100.

The small electronic device 100 comprises a main body case 110, a cover member 120 closably/openably attached to the main body case 110 pivotally supported by a supporting shaft 121, and a pair of wrist bands 130 are attached to the main body case 110.

On the upper side of the main body case 110, a recess portion 111 is formed to which the cover member 120 is fit, and at the center of the recess portion 111, an integrated circuit device housing portion 112 is formed.

The integrated circuit device housing portion 112 is formed into a thin cylindrical circular shape, and on an outer periphery of a bottom portion of the housing portion 112, input/output terminals 113 and a parallel/serial (P/S) converting terminals 114 are arranged in a radial manner. Further, on an inner peripheral wall of the housing portion 112, an engaging projection 115 is formed to serve as a positioning portion for positioning the integrated circuit memory device 200.

The cover member 120 is constructed as, for example, a watch having a display portion DP such as a liquid crystal display panel on a front surface of the cover member. In the cover member 120, an electronic circuit (not shown) consisting of a microcomputer or the like, used for making the display portion DP on the front surface of the cover member 120 display time or various information based on memorized data transferred from the integrated circuit memory device 200 in serial.

As shown in FIG. 2, the integrated circuit memory device 200 is constructed by a substrate 210, electrodes 220 provided on the circuit substrate 210, an integrated circuit memory chip 240 coupled to wiring leads 220 on the circuit substrate 210 via bump electrodes 230, a protector resin 250 for protecting the coupling portions, and a cap 260 hermetically sealing the integrated circuit memory chip 240 coupled on the circuit substrate 210. The integrated circuit memory device 200 is formed into a shape of a thin disk, or coin having a diameter of 10 mm–20 mm×a thickness of 1 mm–2 mm.

In more detail, the circuit substrate 210 has an insulation plate 211 as a base member, and a plurality of wiring leads 220 radially formed to orient an outer peripheral edge of the substrate 210. Each of the wiring leads 220 has an input/output terminal 220b used for data transfer, passed through the insulation plate 211 and arranged in plane on a surface of the insulation plate 211. Further, each of the wiring leads 220 has an electrode 220a in the integrated circuit memory device 200, and the integrated circuit memory chip 240 is bonded to the electrodes 220a. A circuit structure of the integrated circuit memory chip 240 will be described later with reference to FIG. 5.

On an outer periphery of the integrated circuit memory device 200, an engaging recess 201 is formed as a positioning portion being able to be engaged with the engaging projection 115 as the positioning portion of the housing portion 112 of the small electronic device 100.

The integrated circuit memory device 200 is so constructed as described above, and when it is housed in the housing portion 112 of the small electronic device 100, the engaging recess 201 is engaged with the engaging projection 114 to be positioned and then the cover member 120 is closed.

Time is always displayed on the display portion DP on the front surface of the cover member 120, and when a change-over switch (not shown) of the small electronic device 100 is operated, information of the memorized data read out from the integrated memory circuit 200 is displayed on the display portion.

Figure 5:
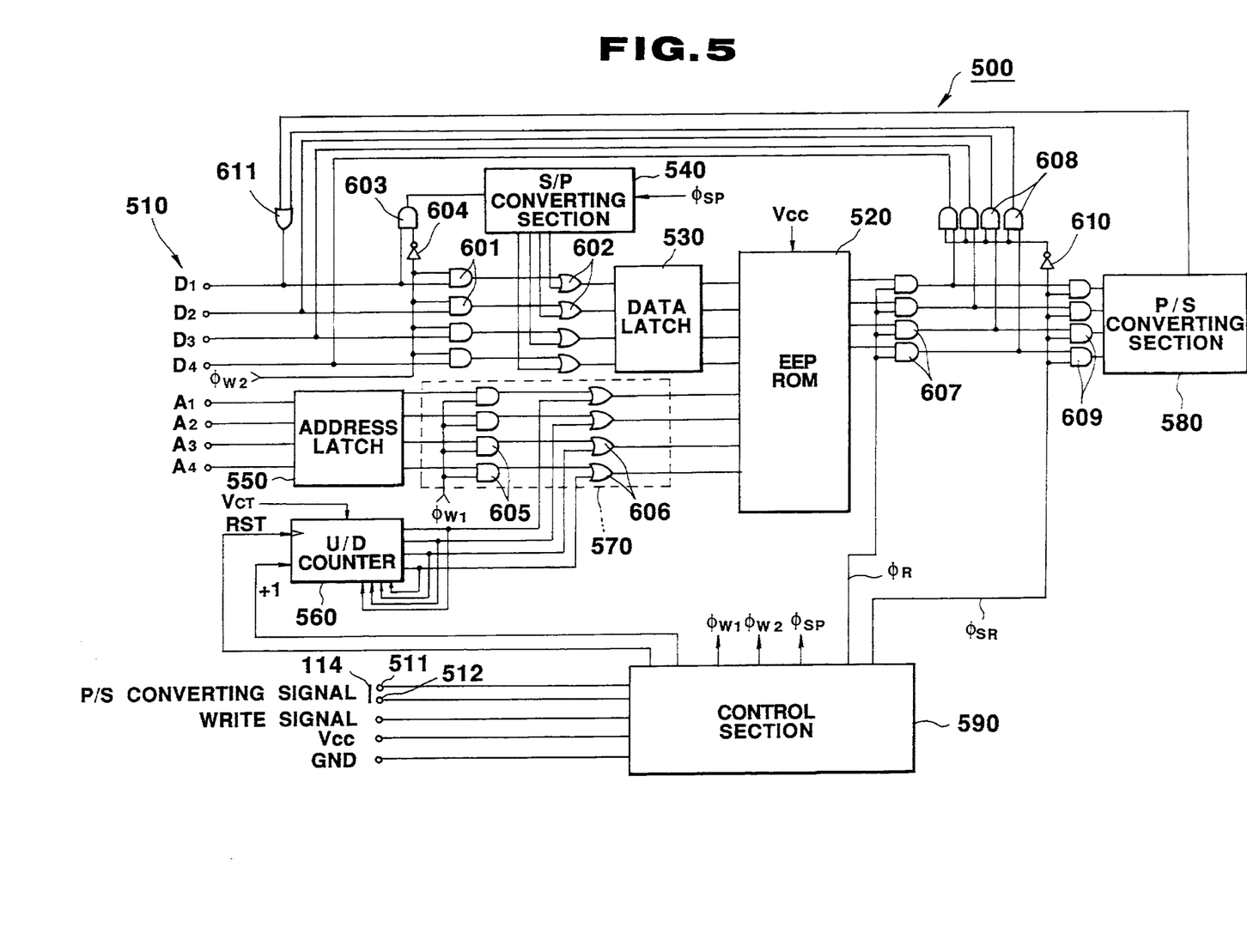
FIG. 5 is a circuit diagram accommodated in a memory chip constituting the integrated circuit memory device shown in FIG. 2.

In the above description, the integrated circuit memory device 200 is applied to the small electronic device 100 constructed as a wrist watch making serial transfer, but the integrated circuit memory device 200 can be also applied to other electronic device (for example, IC card) having a data transfer process different from that of the above described case, by constructing the integrated circuit memory chip 240 of the integrated circuit memory device 200 with the electronic circuit 500 shown in FIG. 5.

Figure 3:
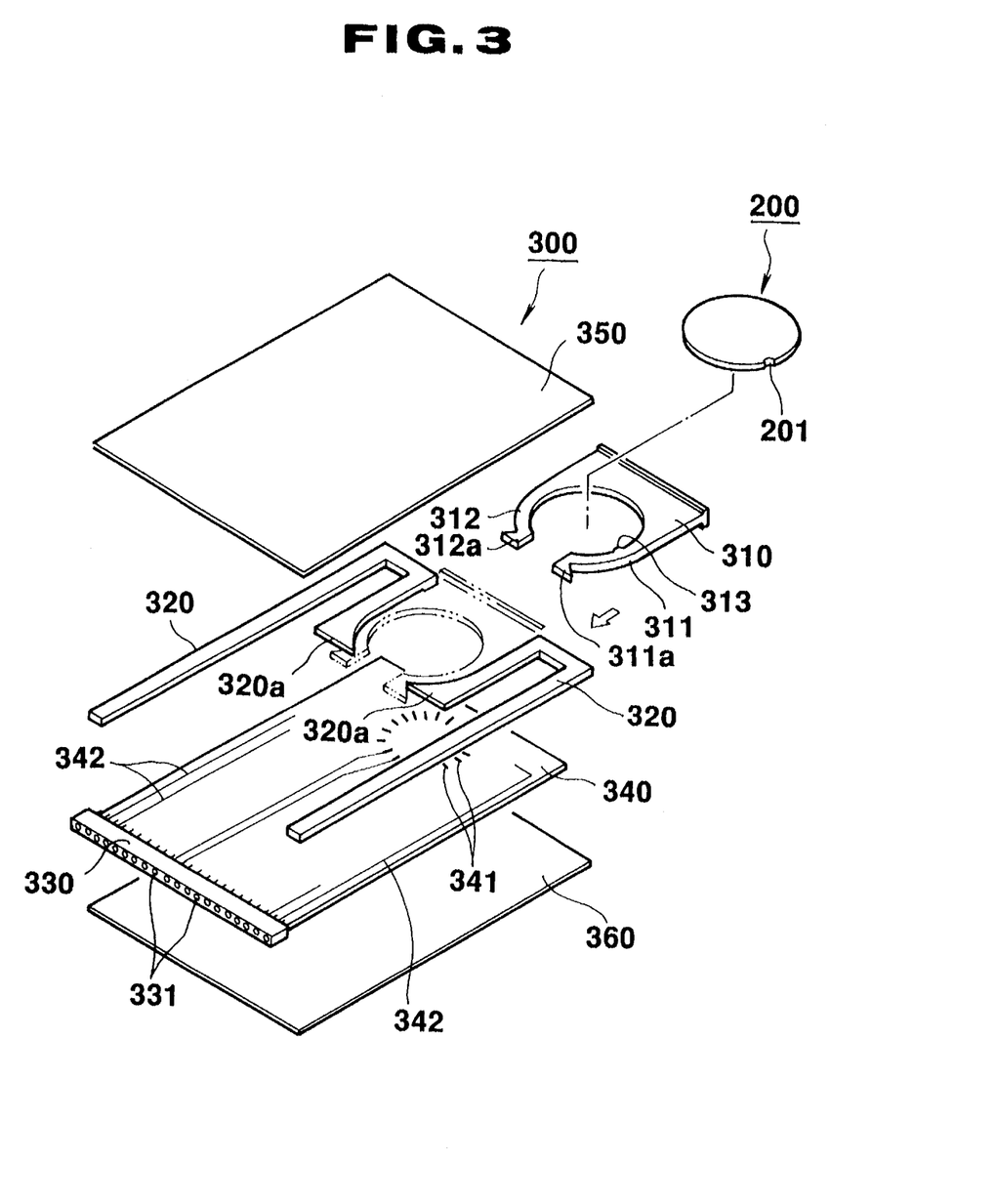
FIG. 3 is an exploded perspective view of an IC card-type adapter according to a first embodiment of the invention, to which the integrated circuit memory device is detachably mounted.
Figure 4A:
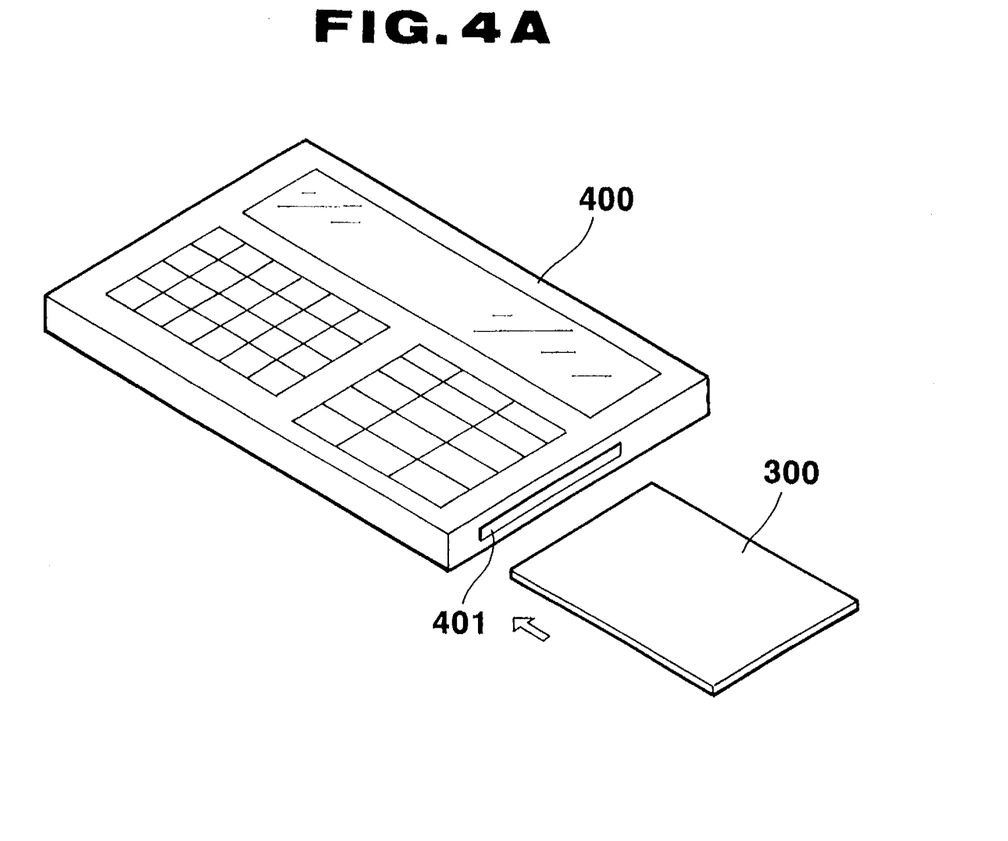
FIG. 4A is a perspective view of the IC card-type adapter shown in FIG. 3, and an electronic device to which the IC card-type adapter is inserted.

FIGS. 3 and 4A show an example in which the integrated circuit memory device 200 is applied to an IC card-type adapter of the invention. FIG. 3 is an exploded perspective view of the IC card-type adapter, and FIG. 4A is a perspective view of an electronic device 400 in which an IC card is used.

In FIG. 3, an IC card-type adapter 300 comprises a memory device holder 310 for housing the integrated circuit memory device 200 in a state that it is positioned in a predetermined position, frame-like supporting members 320 for being engaged with the memory device holder 310 after the holder 310 is inserted into a main body, a circuit substrate 340 having a connector 330 in which a number of female type input/output pins 331 for parallel transfer are arranged, a front case 350, and a rear case 360. In a case of this embodiment, the IC card-type adapter 300 is constructed as an IC card, which becomes a memory portion of an electronic device. The integrated circuit memory device 200 comprises a parallel/serial converting circuit and a parallel/serial change-over terminal for changing a signal transfer fashion in parallel or in serial both described later, and when the integrated circuit memory device 200 is properly housed in the IC card-type adapter 300, data input to and output from the integrated circuit memory device 200 is transferred in parallel. Namely, when the integrated circuit memory device 200 is housed in the IC card-type adapter 300 and the IC card-type adapter 300 employing the integrated circuit memory device 200 is housed in an electronic device which conducts a parallel data transfer, the data memorized in the integrated circuit memory device 200 is transmitted to and received from the electronic device in the parallel fashion.

In the memory device holder 310, semi-circular housing portions 311, 312 for surrounding an outer periphery of the circular integrated circuit memory device 200 and holding it are formed, and engaging projections 311a, 312a are formed at distal ends of the housing portions 311, 312 so as to engage the memory device holder 310 with the supporting members 320 when the holder 310 is inserted into the supporting members 320. On an inner circumferential wall of one of the housing portions 311 of the memory device holder 310, an engaging projection 313 is formed as a positioning portion for positioning the integrated circuit memory device 200.

Since the supporting member 320 is constructed as a supporting member for supporting the memory device holder 310 and is constructed to be branched into two members in the IC card-type adapter 300, end portions 320a of the supporting members 320 in the memory device holder 310 engage with the engaging projections 311a, 312a of the memory device holder 310 when the memory device holder 310 is inserted into the main body, and the memory device holder 310 is detachably fixed with the supporting member 320.

The circuit substrate 340 is made of an insulation plate, and connection terminals 341 are radially arranged on the plate at positions facing the electrodes 220b of the integrated circuit memory device 200. The connection terminal 341 can be made of metal foil by a known method of manufacturing a printing wiring board, but each of the connection terminals 341 may be made by using, for example, a plate spring, coil spring, or pin movably supported by a spring in order to increase the reliability of connection. At a side surface of the IC card-type adapter 300, a connector 330 in which female type input/output pins 331 is provided. Each of the input/output pins 331 is connected at its one end to a connection terminal 341 via a connection lead 342, and the other end of each pins 331 is exposed to the outside of the device to be connected to another electronic device. In other words, the connector 330 in which the input/output pins 331 are arranged is to electrically connect to an electronic device 400 shown in FIG. 4A. Transmission and reception of data is carried out in the parallel between the integrated circuit memory device 200 and the external electronic device connected to the memory device 200 via the connector 330.

Double-sided adhesive sheets (not shown) are provided on the outer peripheral portion of the supporting member 320, which becomes a side surface of the IC card-type adapter 300, and also at predetermined positions of each of the circuit substrate 340, the front case 350, and the rear case 360, which are brought into contact with the outer peripheral portion. These members are adhered with each other by the double sided adhesive sheets so as to constitute the IC card-type adapter 300.

Figure 4B:
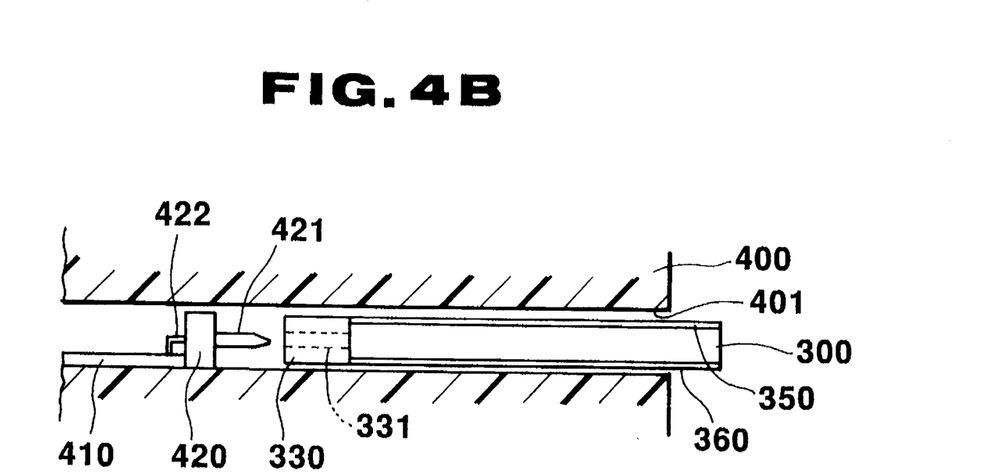
FIG. 4B is an enlarged cross section showing a part of the electronic device and the IC card-type adapter shown in FIG. 4A, and used to explain the connection between these.

FIG. 4A is a perspective view showing an electronic device 400 such as an electronic notebook, to which the IC card-type adapter 300 constructed as described above is applied, and FIG. 4B is a cross sectional view for explaining the connection of the electronic device 400 to the IC card-type adapter 300. When the IC card-type adapter 300 in which the integrated circuit memory device 200 has been mounted is inserted into the electronic device 400 from a card slot 401 in a direction indicated by an arrow, as shown in FIG. 4A, male type input/output pins 421 of a connector 420 located in the electronic device 400 are fit into the female type input/output pins 331 of the IC card-type adapter 300 and electrically connected to each other. One end 422 of each of the input/output pins 421 is connected to the circuit substrate 410 so that transmission/reception of data is carried out in parallel, as will be described later.

FIG. 5 shows a circuit structure of the integrated circuit memory chip 240 housed in the integrated circuit memory device 200.

In FIG. 5, 500 is an electronic circuit in the memory chip 240. The electronic circuit 500 is provided with external terminals 510 for carrying out transmission/reception of data between the circuit 500 and the small electronic device 100 or the electronic device 400. The external terminals 510 are constructed by data input/output terminals D1–D4 through which parallel transfer data (but, when they are connected to the small electronic device 100, only the input/output terminal D1 functions as the input/output terminal) is exchanged with the electronic device 400, address input terminals A1–A4 through which address signals from the small electronic device 100 or electronic device 400 are input, parallel/serial change-over terminals 511, 512 through which P/S change-over signals for changing a transfer fashion are input, a Write signal terminal via which a Write signal is input, a Vcc terminal via which a power source voltage vcc is supplied, and a GND terminal via which GND is supplied.

The parallel/serial change-over terminals 511, 512 are brought into contact by wiring to two neighboring input/output terminals 200b in the input/output terminals 220b of the integrated circuit memory device 200. For example, when the integrated circuit memory device 200 is housed in the integrated circuit device housing portion 112 of the small electronic device 100 which is driven in the serial fashion, the input/output terminals 220b of the integrated circuit memory 200 coupled with the parallel/serial change-over terminals 511, 512 are brought into contact electrically with the width-wide parallel/serial change-over terminal 114 (see FIG. 1) printed on the housing portion 112 of the electronic device 100. Thus, the parallel/serial change-over terminals 511, 512 are electrically coupled with each other so that a serial transfer mode is set.

The electronic circuit 500 is constructed by the external terminal 510; an EEPROM (erasable and electrically programmable ROM) 520 which is electrically writable and rewritable; a data latch 530 for latching data input through the data input/output terminals D1–D4; a serial/parallel converting section 540 for converting serial data into parallel data in accordance with a serial-parallel control signal $\phi$SR output from a control section 590, described later, when serial data is supplied to the input/output terminal D1, and for outputting the parallel data to the data latch 530; an address latch 550 for latching address signals input to the address input/output terminals A1–A4; an up/down counter 560 for counting up the number of times of serial transfer performed by +1 and for outputting a VCT voltage supplied at the timing as address data, an address selector 570 for selecting one of addresses supplied from the input terminals A1–A4 and addresses generated by the up/down counter 560 and for outputting the selected address to the EEPROM 520; a parallel/serial converting section 580 for converting parallel data, read out from the EEPROM 520 in the serial transfer mode (when the small electronic device 100 is connected thereto), into serial data, and for outputting the serial data to the input/output terminal D1; and a control section 590 for outputting control signals on the basis of a write signal, a parallel/serial change-over signal, (ON signal by the parallel/serial terminals 511, 512) etc. and for controlling data input/output of parallel and serial transfers.

More particularly, from the control section 590, a clock signal $\phi$W1 for conducting access of an address in synchronizing with a clock, a clock signal $\phi$W2 serving as a timing signal for writing data, a clock signal $\phi$R serving as a timing data for reading out data, a serial-parallel control signal $\phi$SP to be output upon the serial transfer and to drive the serial/parallel converting portion 540, a serial read control signal $\phi$SR to be output upon reading out data from the memory in the serial transfer and to drive the parallel/serial converting section 580, and control signals (reset signal RST, and increment signal) for controlling the up/down counter 560 are output. The parallel data input from the data input/output terminals D1–D4 are input to AND gates 601, where the data is synchronized with the clock signal $\phi$W2, and output to OR gates 602. In the serial transfer, the serial data input to the data input/output terminal D1 is input to an AND gate 603, where the data is synchronized with the clock signal $\phi$W2 input through an inverter 604, and further input to the serial/parallel converting section 540. The data converted into parallel data by the serial/parallel converting section 540 is output to the data latch 530 via the OR gates 602.

The addresses latched by the address latch 550 are input to AND gates 605, where the addresses are synchronized with the clock signal $\phi$W1, and output to OR gates 606. In the case of the serial transfer, the addresses from the up/down counter 560 are input to the EEPROM 520 via the OR gates 606. The AND gates 605 and the OR gates 606 constitute an address selector 570.

Parallel data outputs from the EEPROM 520 are input to AND gates 607, where the parallel data outputs are synchronized with the clock signal $\phi$R, and output through AND gates 608 and input/output terminals D1–D4. At the same time, the parallel data outputs from the EEPROM 520 are input to the parallel/serial converting portion 580 via AND gates 609, and in the case of the serial transfer, the serial read control signal $\phi$SR is supplied to the AND gates 609 and turn on them, and an inverted signal from an inverter 610 is supplied to the AND gates 608 and turn off them.

The serial data converted by the parallel/serial converting section 580 in the case of the serial transfer is output through an OR gate 611 and the input/output terminal D1 used in the case of the serial transfer.

An operation of the embodiment will now be described.

At first, an operation for housing the IC card-type adapter 300 into the integrated circuit memory device 200 will be described.

As shown in FIG. 3, when the memory device holder 310 housing the integrated circuit memory device 200 is inserted into the IC card-type adapter 300, the engaging projections 311a, 312a of the memory device holder 310 abut on a deep portion of an inner peripheral wall of each of the supporting member 320. As the memory device holder 310 is further inserted in a deeper direction, the supporting members 320 are expanded outward because they are pressed by the engaging projections 311a, 312a. As the memory device holder 310 is more further inserted in the deeper direction, the engaging projections 311a, 312a of the memory device holder 310 are passed over the end portions 320a of the supporting members 320, and thus the members 320 return to their original form so that the memory device holder 310 is completely engaged with the IC card-type adapter 300.

An operation for mounting the integrated circuit memory device 200 to the small electronic device 100 or the electronic device 400 will now be described.

As shown in FIG. 1, the input/output terminals 220b necessary for the parallel transfer are formed on the lower surface of the integrated circuit memory device 200.

When the integrated circuit memory device 200 is completely set on the IC card-type adapter 300 of the electronic device 400 which carries out the parallel transfer, via the memory device holder 310, the input/output terminals 220b of the integrated circuit memory device 200 and the connection terminals 341 on the circuit substrate 340 of the IC card-type adapter 300 are brought into contact with each other, enabling the parallel transfer. Thus, a 4-bit parallel process can be realized between the electronic device 400 and the integrated circuit memory device 200.

When the integrated circuit memory device 200 is set in the proper position of the housing portion 112 of the electronic device 100, for example, a wrist watch, which carries out the serial transfer, only the input/output terminals 113 and the serial/parallel changing-over terminal 114 are connected to the electrodes 220 of the integrated circuit memory device 200 thereby enabling the serial transfer between the small electronic device 100 and the integrated circuit memory device 200, because only the input/output terminals 113 and serial/parallel changing-over terminal 114 necessary for the serial transfer are connected in the housing portion 112.

Next, an operation of the electronic circuit 500 of the integrated circuit memory device 200 will now be described.

Parallel Transfer State: (in the case where the integrated circuit memory device 200 is housed in the IC card-type adapter device)

Address signals input to the address input terminals A1–A4 are latched by the address latch 550 in advance.

Under this condition, when parallel data are input from the data input terminals D1–D4, the parallel data are synchronized with the clock signal $\phi$W2 at the AND gates 601, and then input via the OR gates 602 to the data latch 530, where the input data are latched.

The latched data are called out from the address latch 550 at the timing of the latch clock signal $\phi$W1, and are output via the OR gates 606 to the EEPROM 520. In the EEPROM 520, the parallel data latched in the data latch 530 are written in the corresponding addresses and stored therein.

In a case of reading out, when address designation is input to the EEPROM 520 from the address input terminals A1–A4, the address designated data is read out from the EEPROM 520 in accordance with the timing clock signal $\phi$R for read-out, and is output via the AND gates 608 and the input/output terminals D1–D4. During this term, the serial lead signal $\phi$SR is OFF, and therefore no parallel data is sent to the parallel/serial converting portion 580.

Serial Transfer State: (in the case where the integrated circuit memory device 200 is housed in the small electric device 100)

Address signals input to the address input terminals A1–A4 are latched by the address latch 550 in advance. At the same time, a power voltage $V^{CT}$ is supplied to the up/down counter 560, and the address is increased by one for each control signal from the control section 590. During this operation, no write timing clock $\phi$W1 is output.

When serial data is supplied to the data input/output terminal D1, the serial data is input to the serial/parallel converting portion 540 via the AND gate 603. The serial/parallel converting portion 540 converts the input serial data into parallel data in accordance with the output timing of the serial/parallel control signal $\phi$SP output from the control section 590, and outputs the parallel data to the data latch 530 via the OR gates 602.

The EEPROM 520 writes the converted parallel data in the write-in address prepared by the up/down counter 560. At this time, timing clock $\phi$W2 for writing data is LOW.

In the case of reading out, when address designation is input to the EEPROM 520 from the address input terminal A1–A4, the addressed designated data is read out from the EEPROM 520 in accordance with the timing clock signal $\phi$R for read-out. In this case, a serial lead signal $\phi$SR is output to the AND gates 609, 608, and therefore the data is converted from the parallel transfer to the serial transfer at the timing of outputting a signal $\phi$SR (that is, the timing for the signal $\phi$SR to be ON), and the serial converted data is output via the OR gate 611 and the data input/output terminal D1. During this, the AND gates 608 are turned off, and therefore no parallel data is output.

As described above, the IC card-type adapter 300 of the invention has the integrated circuit memory device 200 having a plurality of input/output terminals 220b, the memory device holder 310 for detachably housing the integrated circuit memory device 200, and the connector 330 provided with the connection terminals 341 to be connected to the input/output terminals 220b of the integrated circuit memory device 200 housed in the memory device holder 310 and carrying out the transmission/reception of data with the external electronic device 400. And, the integrated circuit memory device 200 is solely attached to and detached from the small electronic device 100 such as a wrist watch for transmitting and recepting data to and from the small electronic device 100. Further, the integrated circuit memory device 200 is set in the IC card-type adapter 300 so that the integrated circuit memory device 200 carries out the transmission/reception of data with the electronic device 400 having connection terminals connected to the connector 330 of the adapter 300. Thus, the data stored in the EEPROM 520 in the integrated circuit memory device 200 can be used in both the small electronic device 100 and the electronic device 400. For example, data to be stored in the integrated circuit memory device 200 is input thereto by an easily-operable big electronic device, and the stored data can be used later for the small electronic device 100 such as a wrist watch.

Figure 6:
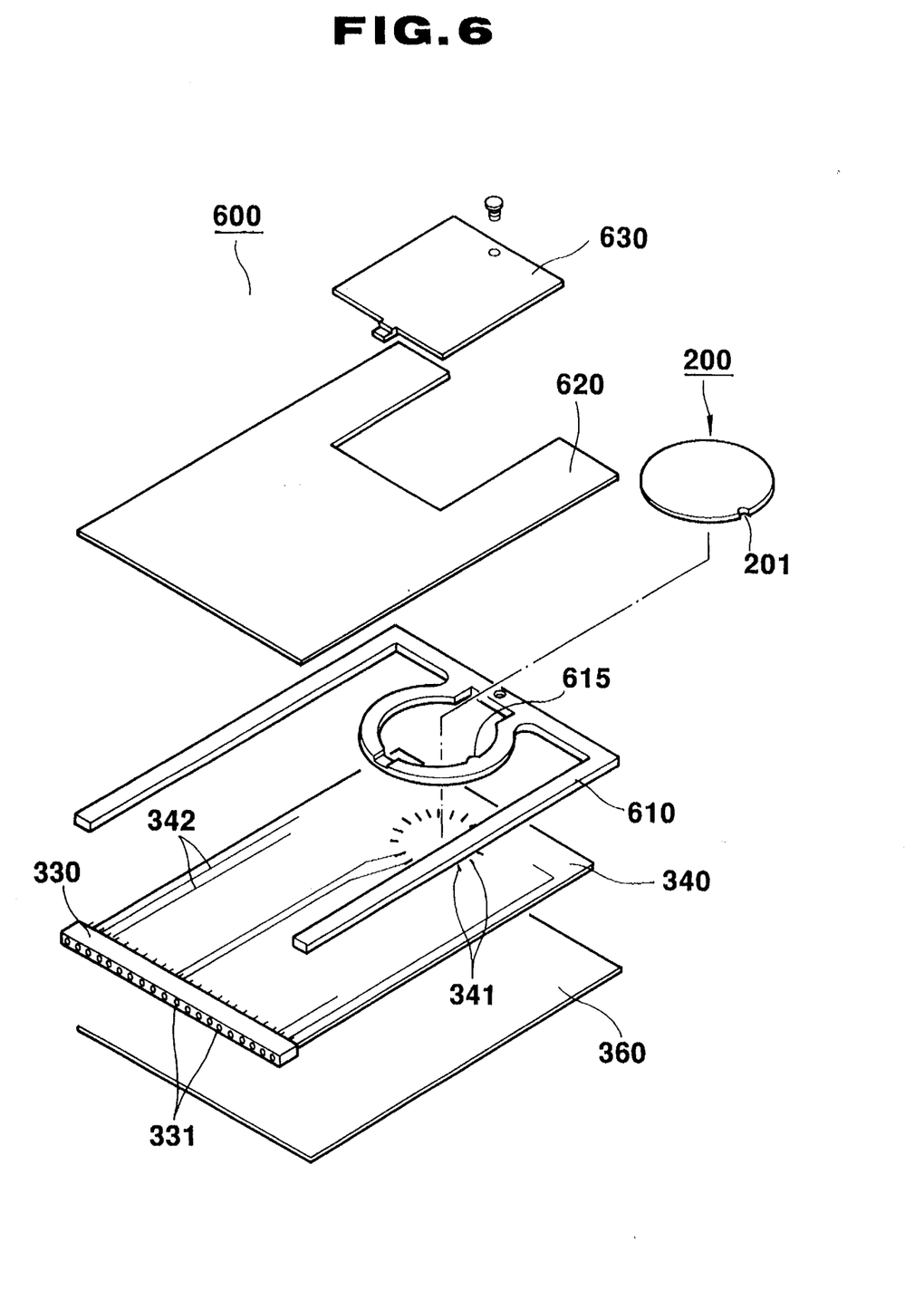
FIG. 6 is a modification of the IC card-type adapter shown FIG. 3.

In the above embodiment, after the integrated circuit memory device 200 is held in the memory device holder 310, the memory device holder 310 employing in the memory device 200 is inserted into and engaged with the IC card-type adapter 300. However, as long as the integrated circuit memory device 200 is appropriately housed in the IC card-type adapter 300, it does not matter how the device 200 is housed in the adapter. For example, in place of the memory device holder 310 and supporting members 320 shown in FIG. 3, a supporting member 610 in which the integrated circuit memory device 200 is fitted without any gap may be provided in an IC card 600 as shown in FIG. 6. In this case, the memory device 200 is housed into the supporting member 610 with the memory device 200 being appropriately positioned by means of an engaging projection 615 formed as a positioning member in the supporting member 610, and then a cover member 630 of a case 620 is fixed by a screw to set the memory device 200 in the IC card 600. With this structure, it is easy to replace the memory device 200 set in the IC card 600 with another one.

Further, in the above embodiment, a converting circuit for converting a parallel data transfer to a serial data transfer or vice versa, is provided in the integrated circuit device 200, and the IC card-type adapter 300 includes only the electrodes 341, connection leads 342, and connector 330, all of which are for electrically connecting the integrated circuit memory device 200 to the electronic device. It is also possible that the integrated circuit memory device 200 is designed only for the serial transfer, and a converting circuit for converting the parallel data transfer to the serial data transfer or vice versa is provided in the IC card-type adapter 300.

Figure 7:
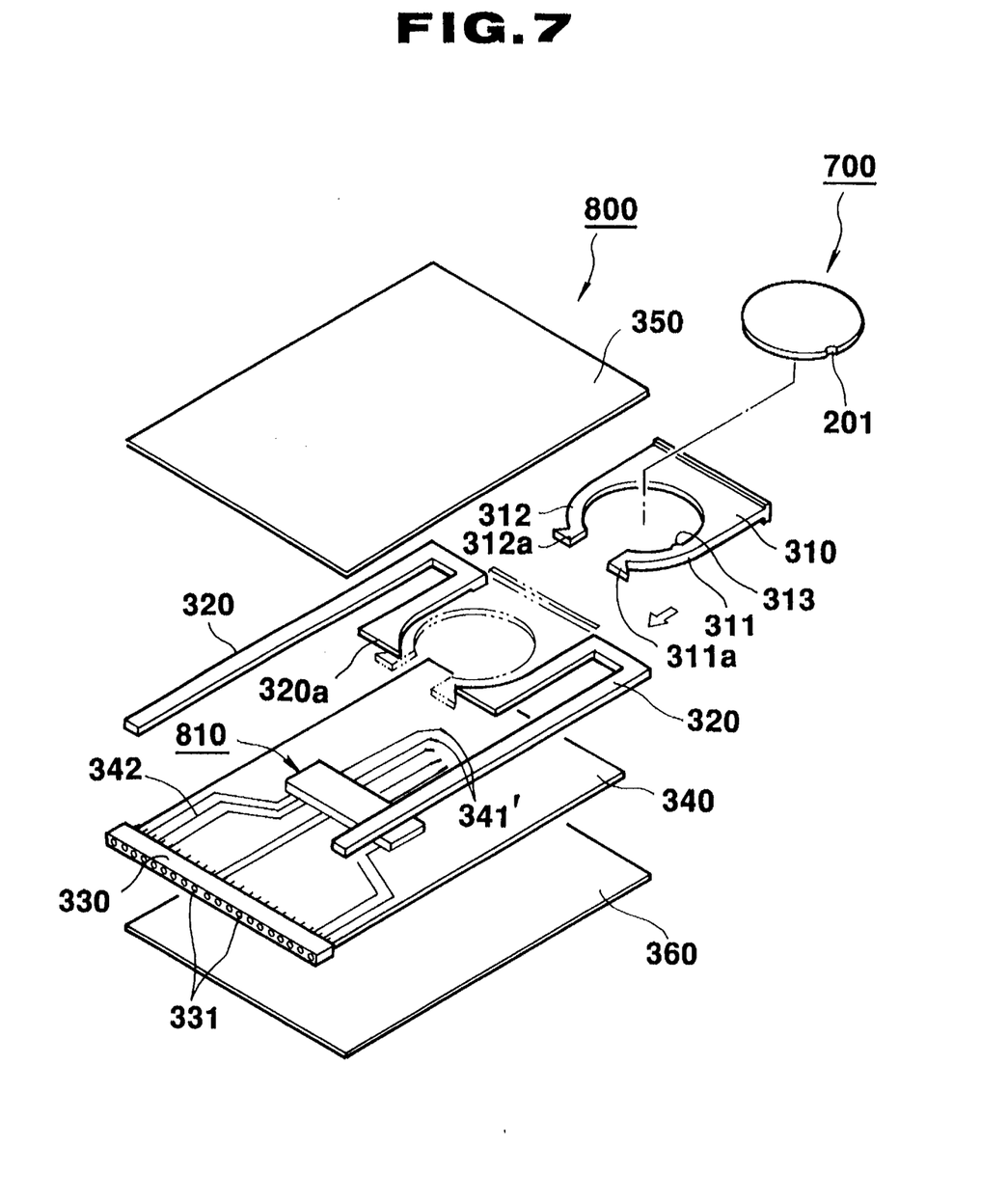
FIG. 7 is an exploded perspective view of an IC card-type adapter of a second embodiment of the invention.

FIG. 7 shows a second embodiment of the invention. The same structural members as those already shown in FIG. 3 are designated by the same reference numerals, and the explanations thereof are omitted. In this embodiment, the circuit in the integrated circuit memory device 700 is constituted only for the serial transfer, and there is only one input/output terminal for data and address, though not shown in the figure. Instead, an IC card-type adapter 800 includes an IC chip 810 for conversion having a serial/parallel converting circuit. The conversion IC chip 810 is bonded by, for example, a face-down bonding to connection leads 342 connected to terminals 341' to be coupled with an integrated circuit memory device 700, and to the connector 330.

Figure 8:
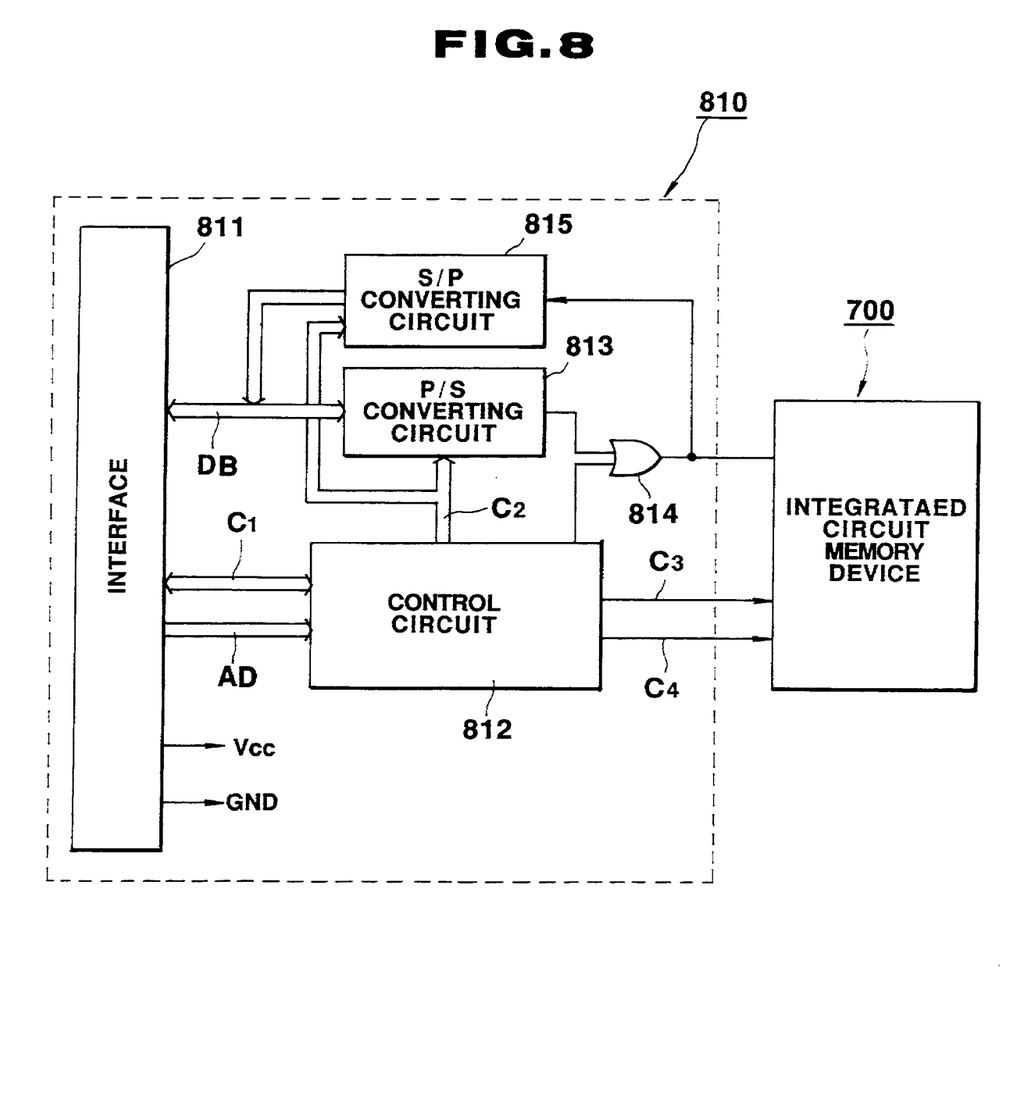
FIG. 8 is a circuit diagram of a circuit of an integrated circuit memory chip being mounted in the integrated circuit memory device shown in FIG. 7.

FIG. 8 shows a circuit structure in the conversion IC chip 810. An interface 811 is connected to the connector 330 and is coupled with a control circuit 812 via a control bus line C1 and an address bus line AD. The control circuit 812 supplies a reset signal RST and a clock to the integrated circuit memory device 700 via control lines C3 and C4. From the interface 811, an address signal and data are sent to a P/S converting circuit 813 via a data/address bus line DB. The control circuit 812 transmits a control signal via a control bus line C2 to the P/S converting circuit 813, where parallel signals transmitted from the interface 811 are converted into a serial signal, and the converted serial signal is output to the integrated circuit memory device 700 via an OR circuit 814. Into the other input terminal of the OR circuit 814, control signals for writing in/reading out are input from the control circuit 812. The data stored in the integrated circuit memory device 700 is transmitted as serial data to the P/S converting circuit 815, where the data is converted into parallel data, and then transmitted to the interface 811. Consequently, in the case of this embodiment, the number of the connection terminals 341' to be connected to input/output terminals of the integrated circuit memory device 700 may be less than that of the input/output pins 331 of the IC card-type adapter 800.

It should be noted that the wrist watch is the small electronic device 100 and the electronic notebook is the electronic device 400 in the above described embodiments, any type of electronic devices can be applied to the invention.

Needless to say, an EPROM, mask ROM, RAM, etc. can be used in the invention in place of the EEPROM used as the memory portion of the integrated circuit memory device 200 used in the above embodiments.

The circuit constituting the integrated circuit memory device 200, the types of the gates, and the number of them are not limited to those in the above described embodiments. For example, an up counter, or down counter may be employed in place of the up/down counter 500.

In the embodiments, the parallel transfer is carried out through 4 bits to achieve a 4-bit parallel process, but a 8-bit, or 16-bit parallel process may be employed as long as the standard set by JEIDA (Japan Electronic Industry Development Association) is satisfied.

Further, the terminals for serial data and for parallel data may be separately provided to each other.

In the embodiments, the parallel/serial change over is carried out based on whether or not the electrode is brought into contact with the parallel/serial changing-over terminals 511 and 512, but may be conducted based on a control signal output from the electronic device.

In the second embodiment, connection of the integrated circuit memory device 700 is performed via the conversion IC chip 810, but the IC card itself may be constituted to have memory functions such as of memory chip and the like. In this case, a converting circuit similar to the conversion IC chip 810 may be provided.

As described, according to the present invention, since a housing portion for detachably housing an integrated circuit device is provided and a connection terminal to be connected to input/output terminals of the integrated circuit memory device is provided in the housing portion, an adapter for an integrated circuit device to or from which the integrated circuit device can be easily attached or detached, and also in which only the integrated circuit device can be replaced with other ones and which can be applied to a plurality of small electronic devices, can be realized.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An adapter for a memory device, comprising:

a case including a housing portion and a memory device holder;

the housing portion having a space for detachably storing the memory device holder;

the memory device holder having a thin disk-like space portion for detachably storing a memory device, and engaging means for engaging the memory device holder with the housing portion;

the memory device having a thin disk-like shape and including a plurality of input/output terminals;

a circuit board housed in the housing portion, the circuit board comprising:

a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion; and connection leads, each connection lead connected to a corresponding one of the connection terminals; and a connector mounted on the housing portion and including a plurality of input/output pins, each of the input/output pins having one end connected to a corresponding one of the connection leads of the circuit board, and another end exposed to the outside of the adapter so as to be connectable to an electronic device.

2. The adapter of claim 1, wherein the space in the housing portion of the case comprises a thin disk-like space.

3. The adapter of claim 1, wherein the memory device comprises integrated circuit chips which are located in the case, and wherein none of the integrated circuit chips are fixedly held in the case.

4. The adapter of claim 1, wherein the case further includes a data parallel/serial converting circuit in the case.

5. The adapter of claim 4, wherein the case further includes a circuit substrate in the case, and wherein the parallel/serial converting circuit is mounted on the circuit substrate.

6. The adapter of claim 1, wherein the case has a frame-like member, a front case portion, and a rear case portion.

7. The adapter of claim 6, wherein the frame-like member has a thin disk-like space for housing therein the memory device.

8. A data transfer system, comprising:

a memory device having an integrated circuit chip and a plurality of input/output terminals; and an adapter for electrically connecting the memory device to an electronic device;

the adapter including a case which has a housing portion and a memory device holder;

the housing portion having a space for detachably storing the memory device holder;

the memory device holder having a space portion for detachably storing the memory device, and engaging means for engaging the memory device holder with the housing portion;

a circuit board housed in the housing portion, the circuit board comprising:

a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion; and connection leads, each connection lead being connected to a corresponding one of the connection terminals; and a connector mounted in the housing portion and including a plurality of input/output pins, each of the input/output pins having one end connected to a corresponding one of the connection leads of the circuit board, and another end exposed to the outside of the adapter so as to be connectable to the electronic device.

9. The data transfer system of claim 8, wherein the memory device has a thin disk-like shape.

10. The data transfer system of claim 8, wherein the integrated circuit chip is not fixedly held in the adapter.

11. The data transfer system of claim 8, wherein the adapter further includes a data parallel/serial converting circuit in the housing portion.

12. The data transfer system of claim 11, wherein the adapter further includes a circuit substrate in the housing portion, and wherein the parallel/serial converting circuit is mounted on the circuit substrate.

13. A data transfer system comprising:

a memory device in which an integrated circuit chip is housed, the memory device including a plurality of input/output terminals;

a first electronic device having input/output elements which are connectable to the input/output terminals of the memory device;

the memory device and the first electronic device transferring data therebetween in a serial fashion;

an adapter for electrically connecting the memory device to a second electronic device;

the adapter including a case which has a housing portion and a memory device holder;

the housing portion having a space for detachably storing the memory device holder;

the memory device holder having a space portion for detachably storing the memory device, and engaging means for engaging the memory device holder with the housing portion;

a circuit board housed in the housing portion, the circuit board comprising:

a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion;

connection leads, each connection lead being connected to a corresponding one of the connection terminals; and a connector mounted in the housing portion and including a plurality of input/output pins having one end connected to a corresponding one of the connection leads of the circuit board and another end exposed to the outside of the adapter so as to be connectable to the second electronic device; and the second electronic device having input/output elements which are connectable to the exposed another ends of the input/output pins of the connector.

14. The data transfer system of claim 13, wherein the memory device has a thin disk-like shape.

15. The data transfer system of claim 13, wherein the first electronic device further includes means for holding the first electronic device on a wrist of a user.

16. A data transfer system comprising:

a memory device in which an integrated circuit chip is housed, the memory device including a plurality of input/output terminals;

a first electronic device having input/output elements which are connectable to the input/output terminals of the memory device;

an adapter for electrically connecting the memory device to a second electronic device;

the adapter including a case which has a housing portion and a memory device holder;

the housing portion having a space for detachably storing the memory device holder;

the memory device holder having a space portion for detachably storing the memory device, and engaging means for engaging the memory device holder with the housing portion;

a circuit board housed in the housing portion, the circuit board comprising:

a plurality of connection terminals, each connection terminal corresponding to one of the input/output terminals of the memory device and making contact with respective input/output terminals of the memory device when the memory device is stored in the space portion of the memory device holder and further the memory device holder is stored in the space of the housing portion; and connection leads, each connection lead being connected to a corresponding one of the connection terminals; and a connector mounted in the housing portion and including a plurality of input/output pins, each of the input/output pins having one end connected to a corresponding one of the connection leads of the circuit board, and another end exposed to the outside of the adapter so as to be connectable to the second electronic device; and the second electronic device having input/output elements which are connectable to the exposed another ends of the input/output pins of the connector; and the adapter and the second electronic device transferring data therebetween in a parallel fashion.

17. The data transfer system of claim 16, wherein the memory device has a thin disk-like shape.

* * * * *